(12) United States Patent
Zhang (10) Patent No.: US 9,662,827 B2
(45) Date of Patent: May 30, 2017

(54) HANDLE POSITIONING APPARATUS OUTSIDE MOULD FOR PRE-INSERTED-HANDLE BOTTLE BLOW MOULDING MACHINE, AND METHOD OF USE THEREOF

(71) Applicant: GUANGZHOU CHEERY PLASTIC PRODUCT CO., LTD, Guangdong (CN)

(72) Inventor: Keqiang Zhang, Guangdong (CN)

(*) Notice: Subject to any disclaimer, the term of this patent is extended or adjusted under 35 U.S.C. 154(b) by 367 days.

(21) Appl. No.: 14/368,512

(22) PCT Filed: Dec. 28, 2012

(86) PCT No.: PCT/CN2012/087822
§ 371 (c)(1),
(2) Date: Jun. 25, 2014

(87) PCT Pub. No.: WO2013/097765
PCT Pub. Date: Jul. 4, 2013

(65) Prior Publication Data
US 2014/0346716 A1    Nov. 27, 2014

(51) Int. Cl.
*B29C 49/20*   (2006.01)
*B29L 31/00*   (2006.01)

(52) U.S. Cl.
CPC ...... *B29C 49/20* (2013.01); *B29C 2049/2017* (2013.01); *B29C 2049/2039* (2013.01); *B29C 2049/2078* (2013.01); *B29L 2031/7158* (2013.01)

(58) Field of Classification Search
None
See application file for complete search history.

(56) References Cited

U.S. PATENT DOCUMENTS 7,003,870 B2 * 2/2006 Yu .......................... B29C 49/20
29/527.2

* cited by examiner

*Primary Examiner* — Monica Huson
(74) *Attorney, Agent, or Firm* — Prakash Nama; Global IP Services, PLLC (57) ABSTRACT

A handle positioning apparatus outside mold for pre-inserted-handle bottle blow molding machine, and a method of use thereof. The apparatus comprises a sliding block base, a handle positioning assembly, and a bottle pre-form positioning assembly. The bottle pre-form positioning assembly is provided in the middle of the sliding block base, and the handle positioning assembly is provided at one end of the sliding block base. The method of use thereof involves the handle positioning apparatus outside mold carrying a bottle pre-form being placed on a bottle pre-form conveying track; at the awaiting blow molding position, a handle is placed into the handle positioning apparatus outside mold, and the same is transported into the mold where the bottle will be blown and once completed, is discharged via the bottle pre-form conveying track.

8 Claims, 11 Drawing Sheets

HANDLE POSITIONING APPARATUS OUTSIDE MOULD FOR PRE-INSERTED-HANDLE BOTTLE BLOW MOULDING MACHINE, AND METHOD OF USE THEREOF

BACKGROUND OF THE INVENTION

The present invention relates to the technical field of blow moulding, and more specifically relates to a handle positioning apparatus outside mould for pre-inserted-handle bottle blow moulding machine, and a method of use thereof.

Polyethylene terephthalate (PET) bottles equipped with handles are not mainstream products in the market of packaging products, but they are necessary in the market of middle to high volume PET bottles. For example, they are quite commonly used for bottling cooking oil and sauces. Furthermore, PET bottles are gradually substituting traditional glass bottles due to a number of disadvantages existing in glass bottles, for example fragility, heavy weight, high energy consumption during the process of manufacturing and high transportation cost etc. Nowadays, there are mainly two methods for manufacturing PET bottles equipped with handles:

Pre-inserted-handle bottle: a bottle is blown by placing a handle and a preform tube into a bottle blow moulding machine at the same time. Since the handle and the bottle body are fixed tightly together, the handle has high resistance against tensional force and therefore is not easy to break off. However, the manufacturing of this kind of bottle requires high cost of labouring but the production efficiency is low. Although some but not many bottle blow moulding machines for making pre-inserted-handle bottle are equipped with mechanical arms for placing the handles into the moulds before bottle blow moulding, the use of mechanical arms as such does not result in high production efficiency. Besides, the cost of producing and installing mechanical arms is high.

Post-inserted-handle bottle: After blow moulding of the bottle body, a handle is combined with the bottle body to form the bottle. This kind of manufacturing method has high production efficiency and the cost of laboring is lower. However, the handle of this kind of bottle is not good at resisting tensional force, and the bottle itself is also not good at resisting pressure. Therefore this kind of bottle is not suitable for long distance transportation.

Figure 1:
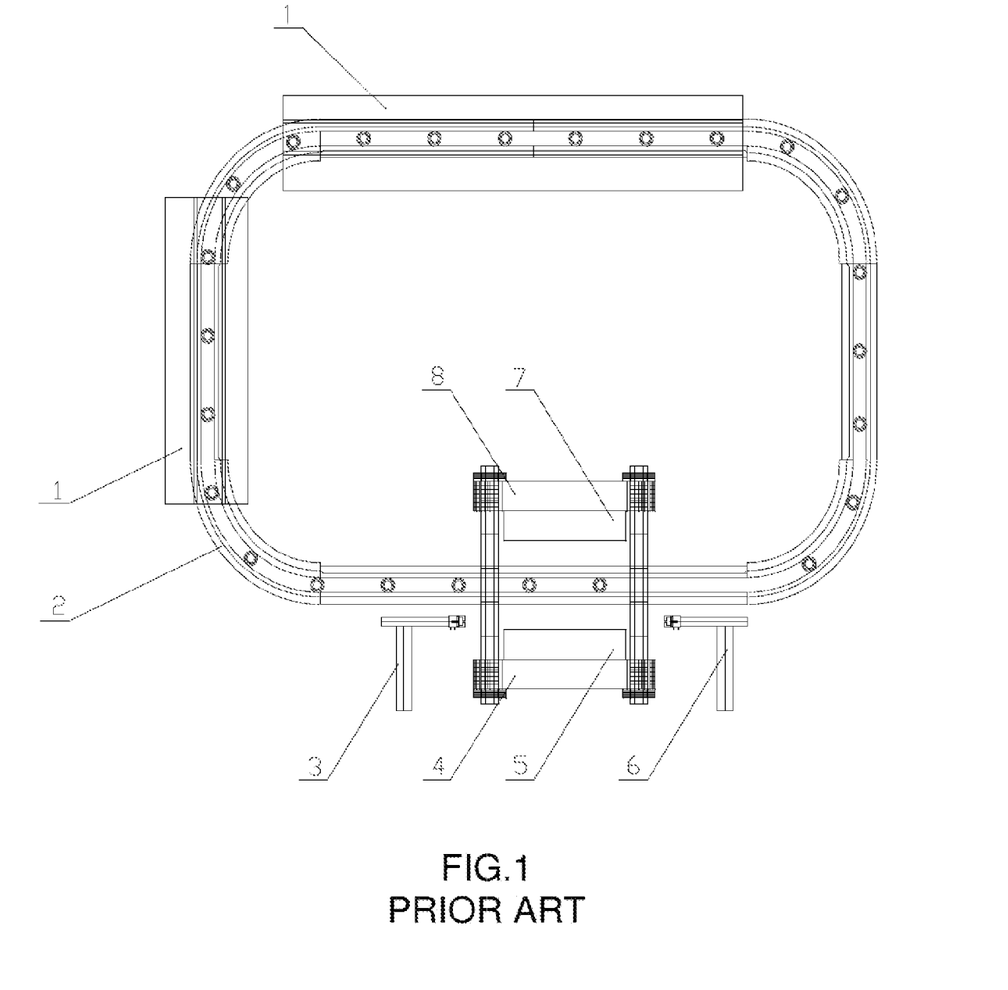
FIG. 1 is a structural view of a pre-inserted-handle bottle blow moulding machine according to existing prior art.

As shown above, the methods of manufacture directly affect product properties, production efficiency and the cost of production equipment. In these recent years, automatic bottle blow moulding machine for pre-inserted-handle bottle becomes a facility receiving major attention in facility research and development due to increasing market demand, rising cost of manpower resources and greater awareness of energy conservation and environmental friendliness. However, the problem of poor production efficiency has not been solved. In most of the existing prior arts of making pre-inserted-handle bottle, bottle blow moulding machines requiring manual operation are still used for manufacture. Problems associated with this kind of manually operated machines still exists, for example, high level of manpower input, unstable production quality, low production cost and unsafety etc. In some but not many cases, mechanical arms are used in the bottle blow moulding machines for making pre-inserted-handle bottle. An existing bottle blow moulding machine equipped with mechanical arms for making pre-inserted-handle bottle exemplified in FIG. 1 is used according to the following procedures:

1. According to FIG. 2-1, left and right mechanical arms is holding a handle, while a bottle is blown by using the bottle blow moulding machine;
2. According to FIG. 2-2, after the bottle blow moulding machine has finished blow moulding of the bottle and the mould has been opened, the bottle as produced is removed away from the mould with a safe distance.
3. According to FIG. 2-3, the mechanical arms enter the mould and put the handle in the mould.
4. According to FIG. 2-4, the mechanical arms retreat from the mould and return to a standby position.
5. According to FIG. 2-5, the bottle blow moulding machine closes the mould and blows the bottle. After that the mechanical arms hold another handle and then repeat step 1 again to start blow moulding of another bottle.

In the above procedures, the mould and the mechanical arms move according to the arrows shown in FIGS. 2-1 to 2-5.

The existing bottle blow moulding machine equipped with mechanical arms for making pre-inserted-handle bottle has the following disadvantages:

1. Long production cycle and low production efficiency: After blow moulding of a bottle, the bottle must be removed from the mould with a safe distance before the mechanical arms can enter the mould to place another handle therein, and the mould can only close again for blow moulding of the next bottle after the mechanical arms retreat away from the mould with a safe distance. This kind of operation wastes a lot of production time.
2. Maximum production capacity is twin mould production: Constrained by the movement of and the space required by the mechanical arms, the maximum production capacity for each production is limited to twin mould production. Therefore the production efficiency of the bottle blow moulding machine is limited.
3. High production equipment cost: Due to the use of mechanical arms, the equipment itself and its electrical control involve significantly increased cost. Furthermore, the limitation to the production efficiency of the bottle blow moulding machine will result in the need of purchasing a large quantity of this kind of machine in case of voluminous production. As such, the fixed cost of investment into the equipment will be too high compared to its valve, and thus reducing the willingness of investors to invest in this kind of equipment.

BRIEF SUMMARY OF THE INVENTION

In view of the aforesaid disadvantages now present in the prior arts, the present invention provides a handle positioning apparatus outside mould for pre-inserted-handle bottle blow moulding machine. The handle positioning apparatus outside mould can on one hand guarantee product quality and on the other hand effectively increase the production efficiency of the bottle blow moulding machine.

Another object of the present invention is to provide a method of using the handle positioning apparatus outside mould for pre-inserted-handle bottle blow moulding machine.

According to the present invention, a handle positioning apparatus outside mould for pre-inserted-handle bottle blow moulding machine is provided on a bottle preform conveying track and comprises a sliding block base, a handle positioning assembly and a bottle preform positioning assembly; the bottle preform positioning assembly is provided in a middle part of the sliding block base; the handle positioning assembly is provided at a first end of the sliding block base; the handle positioning assembly comprises a positioning base, a left positioning panel, a right positioning panel and a press block; the positioning base is fixedly provided on the first end of the sliding block base; the left positioning panel and the right positioning panel are symmetrically provided on the positioning base; the press block is provided below the left positioning panel and the right positioning panel; the press block and the positioning base are fixedly connected; the left positioning panel and the right positioning panel are both hinged with the positioning base.

Two positioning ball plungers are provided on the positioning base to limit the closing positions of the left positioning panel and the right positioning panel respectively; when the left positioning panel and the right positioning panel close, the two positioning ball plungers are popped out by their springs respectively; positioning beads provided at two ends of the springs respectively are inserted into corresponding positioning grooves at back sides of the left positioning panel and the right positioning panel respectively to prevent continuous closing of the left positioning panel and the right positioning panel, thereby limiting the closing positions of the left positioning panel and the right positioning panel; the left positioning panel or the right positioning panel is limited to open up to 15 to 35 degrees when opened; when the left positioning panel and the right positioning panel are opened, limitation of the closing positions is automatically achieved by means of contact surfaces between their bottom parts and the positioning base.

The left positioning panel has an "L" shape while the right positioning panel has a shape of a mirror image of "L"; protruding panels are also provided at the bottom parts of the left positioning panel and the right positioning panel respectively; the bottom parts of the left positioning panel and the right positioning panel are hinged with the positioning base via first screws and screw bushes; the positioning ball plungers are provided at positions corresponding to back sides of the protruding panels of the left positioning panel and the right positioning panel; inner sides of the left positioning panel and the right positioning panel are provided with fixing blocks respectively for fixing a handle; the left positioning panel and the right positioning panel are provided with guiding inclined surfaces respectively; the guiding inclined surfaces are provided on the fixing blocks; the fixing blocks protrude inwardly towards each other on end portions of the left positioning panel and the right positioning panel respectively; the guiding inclined surfaces are inclined at 45-65 degrees with respect to vertical surface; when the left positioning panel and the right positioning panel open, and the handle is pulled upwardly, the handle will move upwardly along the guiding inclined surfaces and push aside the left positioning panel and the right positioning panel towards their outer sides.

The positioning base is an integral structure forming a one whole piece; the positioning base comprises a base side portion and a base seat connected with each other; the base side portion and the base seat together constitute an "L" shape; a middle part of the base side portion is provided with a handle insertion slot in a shape corresponding to the shape of the handle; a platform is provided on the base seat; two sides of the platform are provided with grooves each in a shape of half of a cylindrical column; the base seat is fixedly connected with the sliding block base via third screws.

The bottom parts of the left positioning panel and the right positioning panel are provided with the protruding panels respectively; the protruding panels are provided with holes; bottom parts of the protruding panels provided with holes are positioned in the grooves each having a shape of half of a cylindrical column; the left positioning panel and the right positioning panel are connected with the base side portion at the holes on the protruding panels via first screws and screw bushes.

The press block is provided at outer sides of the protruding panels with holes at the bottom parts of the left positioning panel and the right positioning panel; the press block is fixedly connected with the platform on the base seat via second screws.

The bottle preform positioning assembly comprises a preform head, a preform seat, a bearing and a chain wheel; the preform head and the preform seat are screw threaded; a bottom part of the preform seat has a rotation shaft; the rotation shaft passes through the sliding block base and then connects sequentially with the bearing and the chain wheel; an upper part of the preform head and a bottom part of the chain wheel are provided with snap rings respectively.

The rotation shaft on the preform seat is fixedly connected with the chain wheel via a woodruff key.

The working principle of the handle positioning apparatus outside mould for pre-inserted-handle bottle blow moulding machine is described as follows: when a handle is placed into the positioning base, the handle enters into the handle insertion slot of the base side portion of the positioning base; a bottom part of the handle contacts with the left and right positioning panels; when the handle is pressed downwardly, the bottom parts of the left and right positioning panels rotate so that the left and right positioning panels close and thereby accomplishing self-locking; the fixing blocks at the inner sides of the left and right positioning panels fix the handle in the handle insertion slot; after bottle blow moulding is finished, simply pull out the handle and then the left and right positioning panels will be unlocked and return back to an open condition.

A method of using the handle positioning apparatus outside mould for pre-inserted-handle bottle blow moulding machine comprises the following steps:

1. After a bottle preform is mounted to the preform head of the bottle preform positioning assembly and heating is completed, the handle positioning apparatus outside mould carrying the bottle preform is transmitted to a bottle blow moulding waiting position via transmission of the bottle preform conveying track.

2. At the bottle blow moulding waiting position, the handle is placed into the positioning base; when the handle is pressed downwardly, the left and right positioning panels close and accomplish self-locking and the handle is fixed on the handle positioning assembly.

3. Following the transmission of the bottle preform conveying track, the handle positioning apparatus outside mould carrying the bottle preform is transmitted to a blow moulding position; previous bottle which is already subject to completed blow moulding will be transmitted away from the mould and the previous bottle made with a handle will be removed from its corresponding handle positioning apparatus outside mould so that the left and right positioning panels of that handle positioning apparatus outside mould will open again; new subsequent handle positioning apparatus outside mould carrying another new bottle preform will also be transmitted to the bottle blow moulding waiting position.

4. The blow moulding machine closes the mould and performs bottle blow moulding of the bottle preform at the blow moulding position, while another new handle will be put into the new subsequent handle positioning apparatus outside mould at the bottle blow moulding waiting position.

5. The mould of the blow moulding machine opens and steps 3 and 4 are repeated so that the new bottle preform on the new subsequent handle positioning apparatus outside mould will be subject to bottle blow moulding.

In the above procedures, the bottle blow moulding waiting position refers to a position at a side corresponding to the mould on the bottle preform conveying track.

There are four handle placing sockets at the bottle blow moulding waiting position; in other words, four handles can be placed respectively into corresponding positioning bases of four handle positioning apparatus in step 2.

The handle can be manually placed into the positioning base or placed into the positioning base by using mechanical arms.

The present invention has the following advantages compared with the existing prior art:

1. Speeding up production cycle by saving the time for waiting for the handle to be placed into the mould. Since the placing of handle is done outside of the mould by using the present invention, placing of handle can be performed at the same time with bottle blow moulding operation by the bottle blow moulding machine. Therefore, the present invention saves the time for waiting for the handle to be placed into the mould, thereby significantly speeding up production cycle and increasing the production capacity of the bottle blow moulding machine.

2. The bottle blow moulding machine has a higher value compared to its cost due to multiple-mould production. A plurality of the apparatus according to the present invention can be arranged in a row coordinating with the moulds. Subject to the size of the moulds, four or six moulds can be used simultaneously for production. On the contrary, only two moulds can be used simultaneously according to existing apparatus using mechanical arms. The production capacity is therefore multiplied, thereby increasing the value of the bottle blow moulding machine as compared to its cost.

3. Simpler structure with reduced production equipment cost. The structure of the present invention is simple, compact, and can be manufactured at a low cost. It is not necessary for the present invention to equip with complicated circuits for controlling the mechanical arms or to provide a large amount of space to accommodate the mechanical arms. Therefore, the present invention effectively reduces production equipment cost and saves installation space.

BRIEF DESCRIPTION OF THE DRAWINGS

FIG. 2-1 is a schematic view showing the use of the pre-inserted-handle bottle blow moulding machine according to existing prior art when the mechanical arms hold a handle.

FIG. 2-2 is a schematic view showing the use of the pre-inserted-handle bottle blow moulding machine according to existing prior art when the mould opens.

FIG. 2-3 is a schematic view showing the use of the pre-inserted-handle bottle blow moulding machine according to existing prior art when the mechanical arms enter the mould.

FIG. 2-4 is a schematic view showing the use of the pre-inserted-handle bottle blow moulding machine according to existing prior art when the mechanical arms retreat from the mould.

FIG. 2-5 is a schematic view showing the use of the pre-inserted-handle bottle blow moulding machine according to existing prior art when the bottle blow moulding machine closes the mould.

FIG. 7-1 shows the handle positioning apparatus outside mould according to the present invention at a bottle blow moulding waiting position.

FIG. 7-2 shows the handle positioning apparatus outside mould according to the present invention when it enters a mould.

FIG. 7-3 shows the bottle blow moulding operation by the bottle blow moulding machine after closing the mould when the handle positioning apparatus outside mould according to the present invention is used.

Reference signs in the figures: 1: heating box; 2: bottle preform conveying track; 3: left mechanical arm; 4: rear mould plate; 5: rear mould for bottle blow moulding; 6: right mechanical arm; 7: front mould for bottle blow moulding; 8: front mould plate; 9: sliding block base; 10: positioning base; 11: left positioning panel; 12: right positioning arm; 13: press block; 14: positioning ball plungers; 15: first screws; 16: screw bushes; 17: second screws; 18: preform head; 19: preform seat; 20: bearing; 21: chain wheel; 22: snap rings; 23: woodruff key; 24: third screws; 25: handle; 26: driving cylinder; 27: springs; 28: positioning beads; 29: positioning grooves; 30: guiding inclined surfaces.

DETAILED DESCRIPTION OF THE INVENTION

The present invention is further described below with reference to an embodiment and to the accompanying drawings. It should be noted that specific implementation of the present invention is not limited to the description herein.

Embodiment

Figure 3:
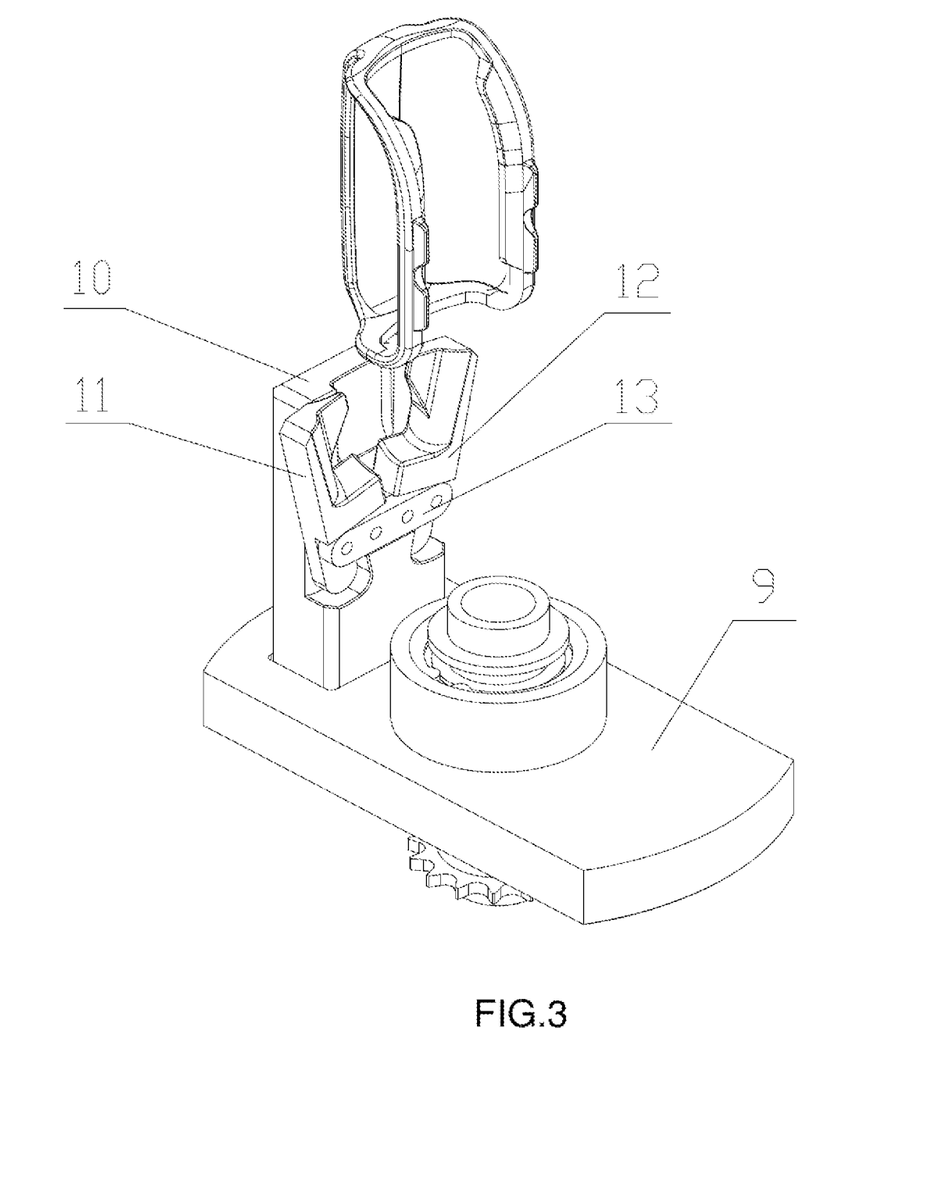
FIG. 3 shows a structural view of the handle positioning apparatus outside mould according to the present invention.
Figure 4:
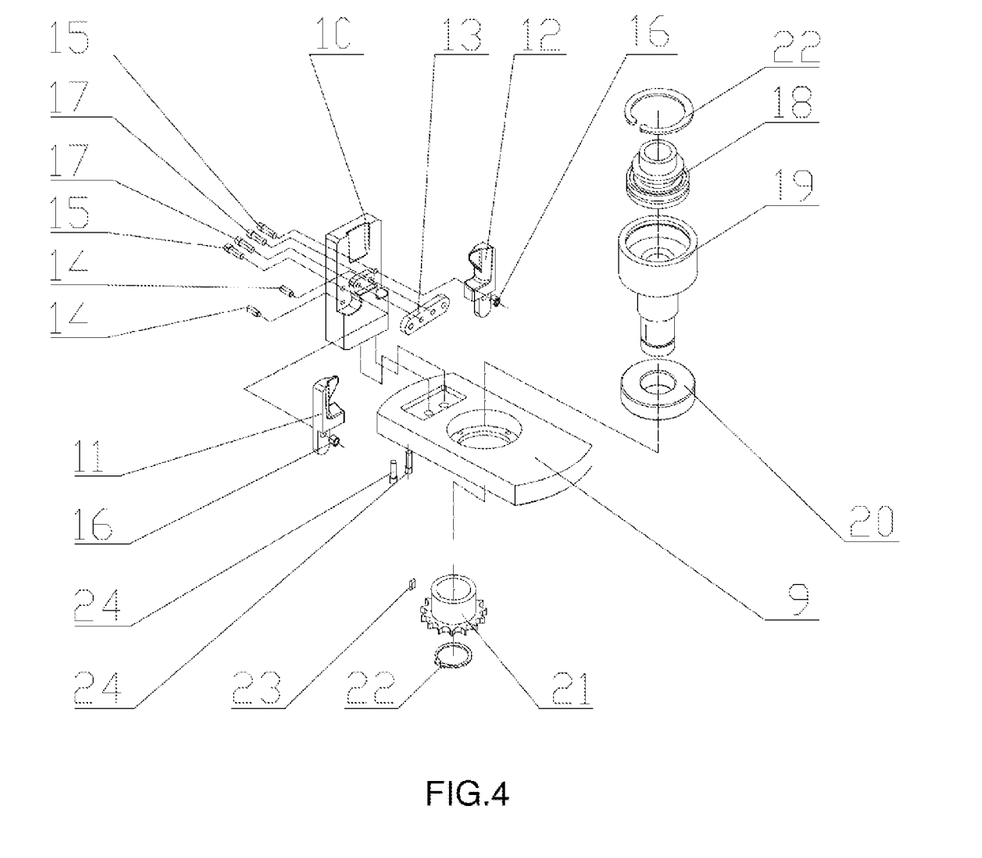
FIG. 4 shows a structural view of the constituting components of the handle positioning apparatus outside mould according to the present invention.
Figure 6:
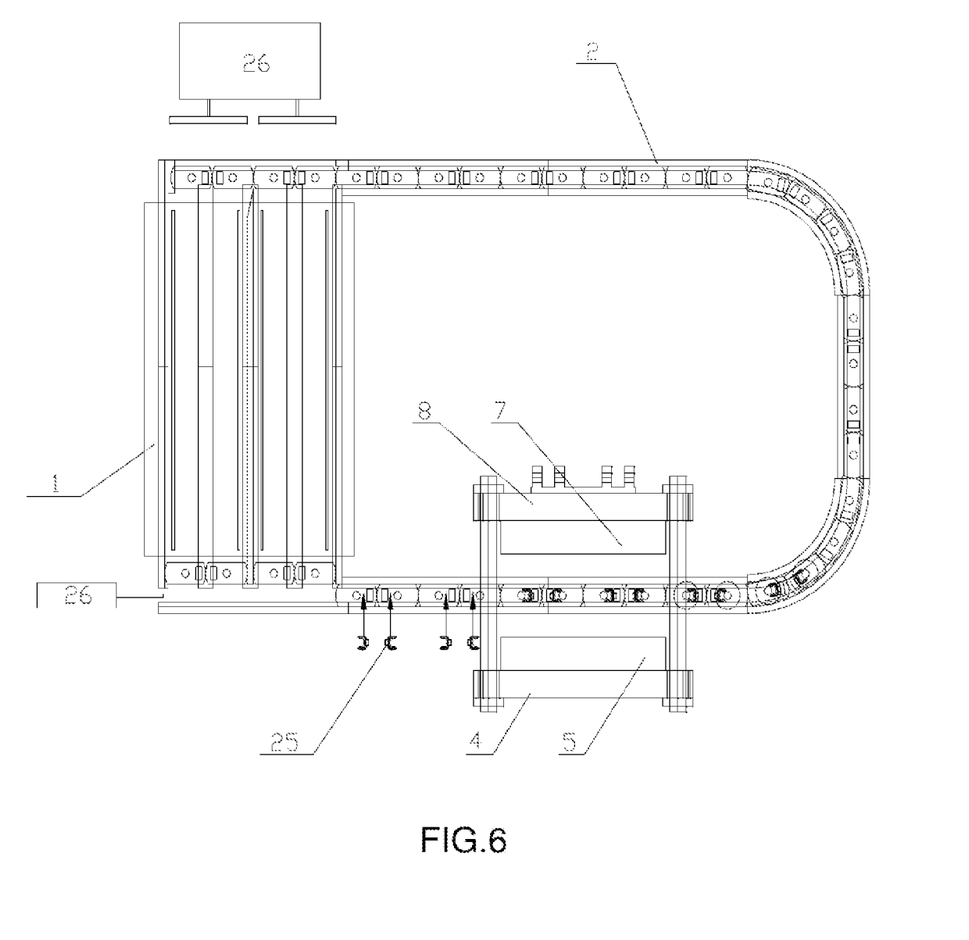
FIG. 6 shows the use of the handle positioning apparatus outside mould according to the present invention in the pre-inserted-handle bottle blow moulding machine.

A handle positioning apparatus outside mould for pre-inserted-handle bottle blow moulding machine is provided on a bottle preform conveying track 2 as shown in FIG. 6; FIG. 3 or FIG. 4 shows a detailed structure of the handle positioning apparatus outside mould for pre-inserted-handle bottle blow moulding machine, which comprises a sliding block base 9, a handle positioning assembly and a bottle preform positioning assembly; the bottle preform positioning assembly is provided in a middle part of the sliding block base 9; the handle positioning assembly is provided at a first end of the sliding block base 9; the handle positioning assembly comprises a positioning base 10, a left positioning panel 11, a right positioning panel 12 and a press block 13; the positioning base 10 is fixedly provided on the first end of the sliding block base 9; the left positioning panel 11 and the right positioning panel 12 are symmetrically provided on the positioning base 10; the press block 13 is provided below the left positioning panel 11 and the right positioning panel 12; the press block 13 and the positioning base 10 are fixedly connected; the left positioning panel 11 and the right positioning panel 12 are both hinged with the positioning base 10.

Figure 9:
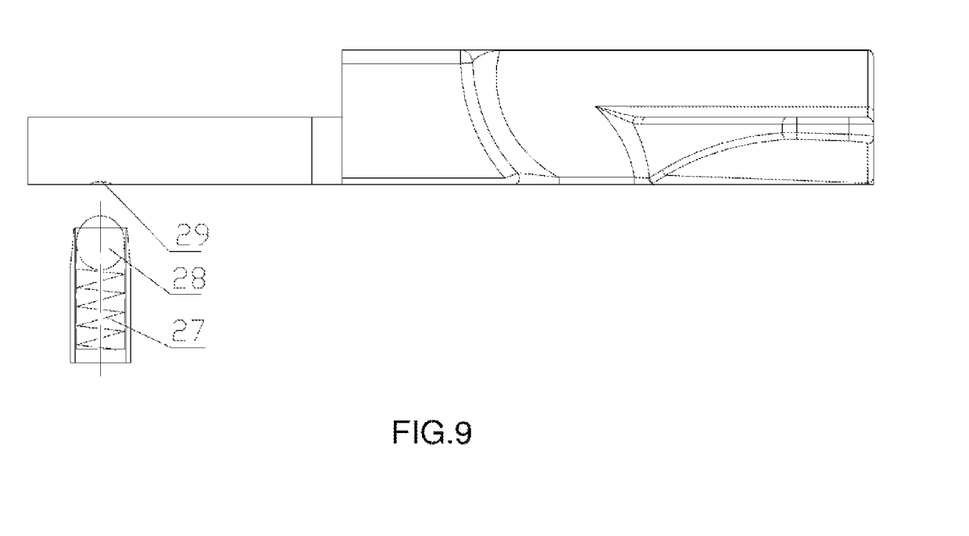
FIG. 9 is a view seen according to direction A shown in FIG. 8.
Figure 21:
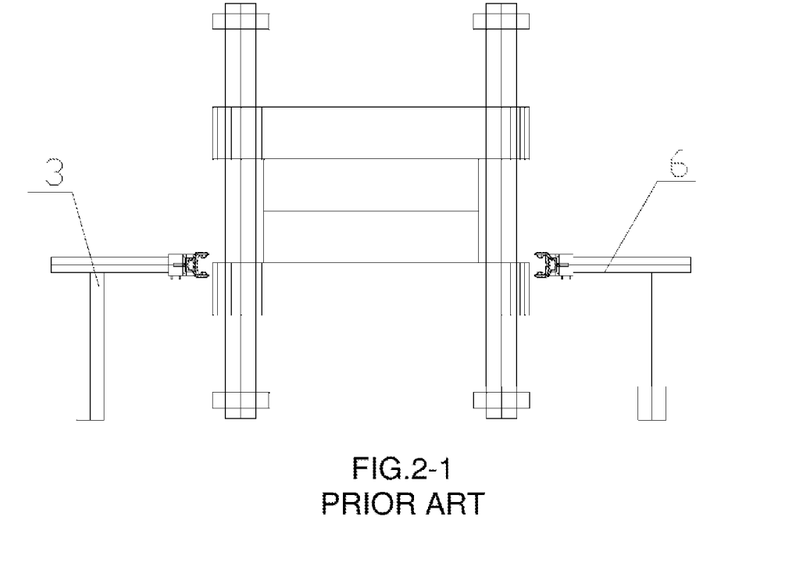
Figure 22:
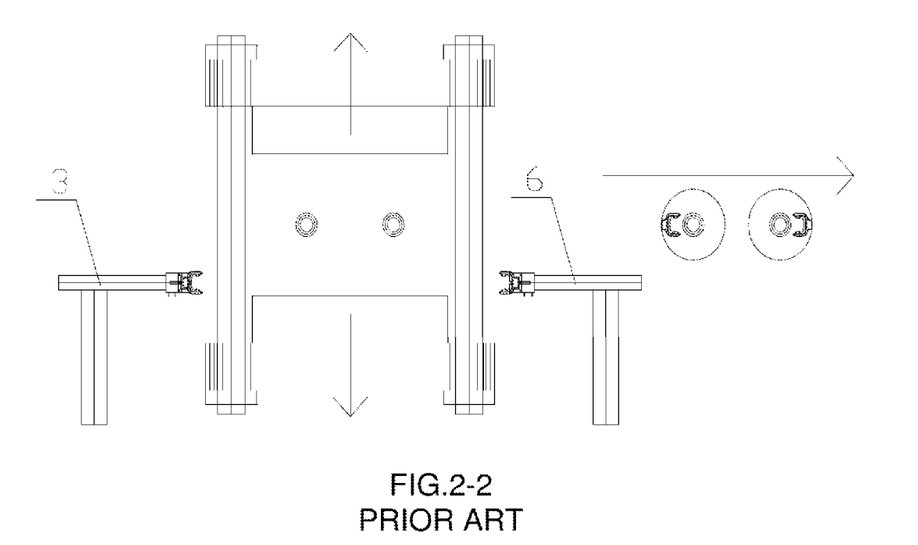
Figure 23:
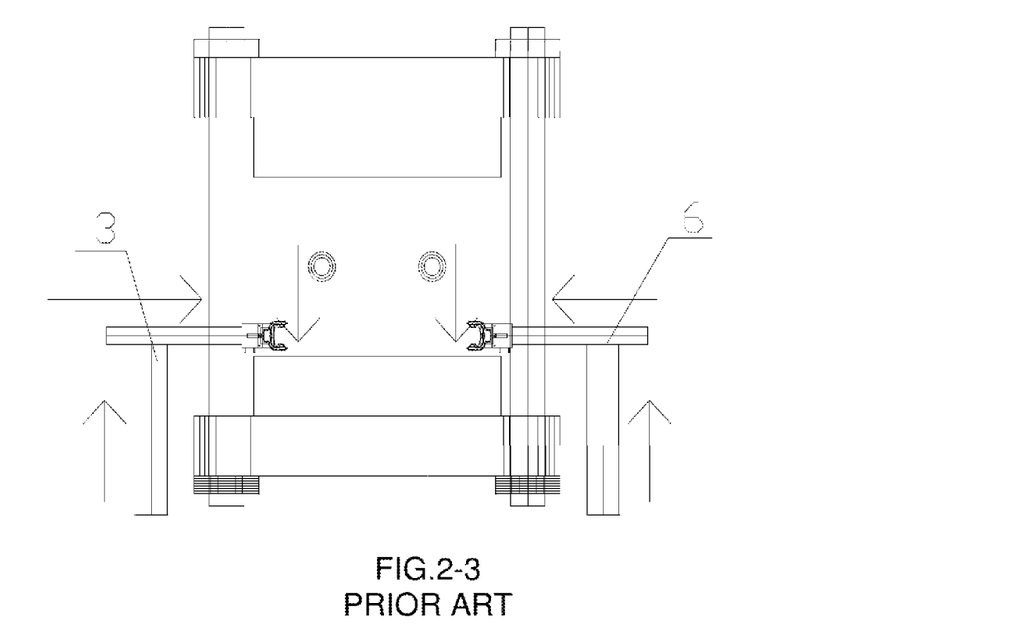
Figure 24:
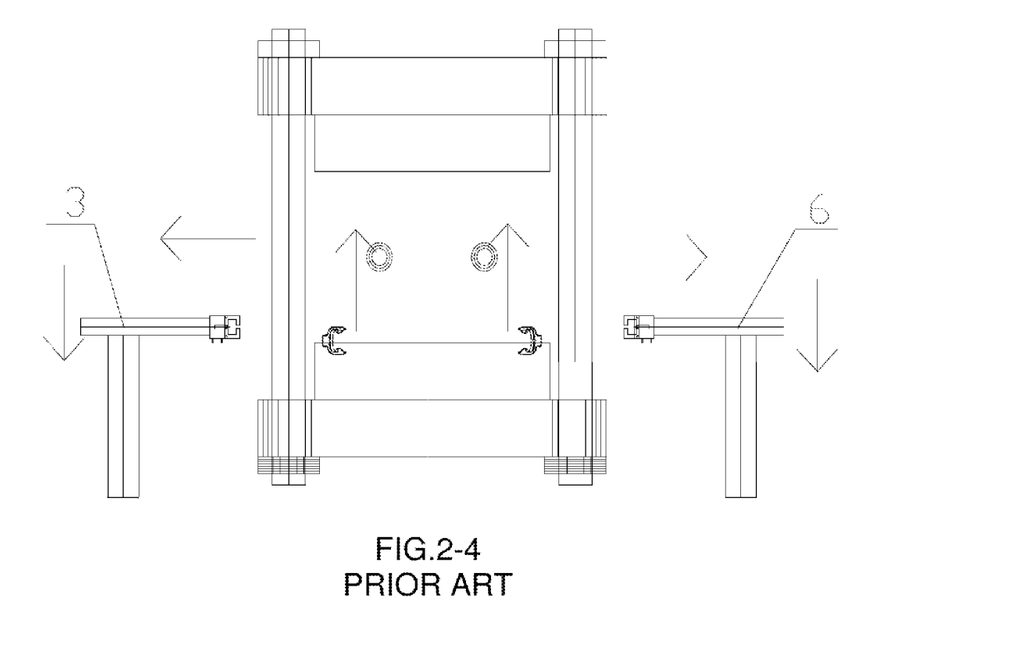
Figure 25:
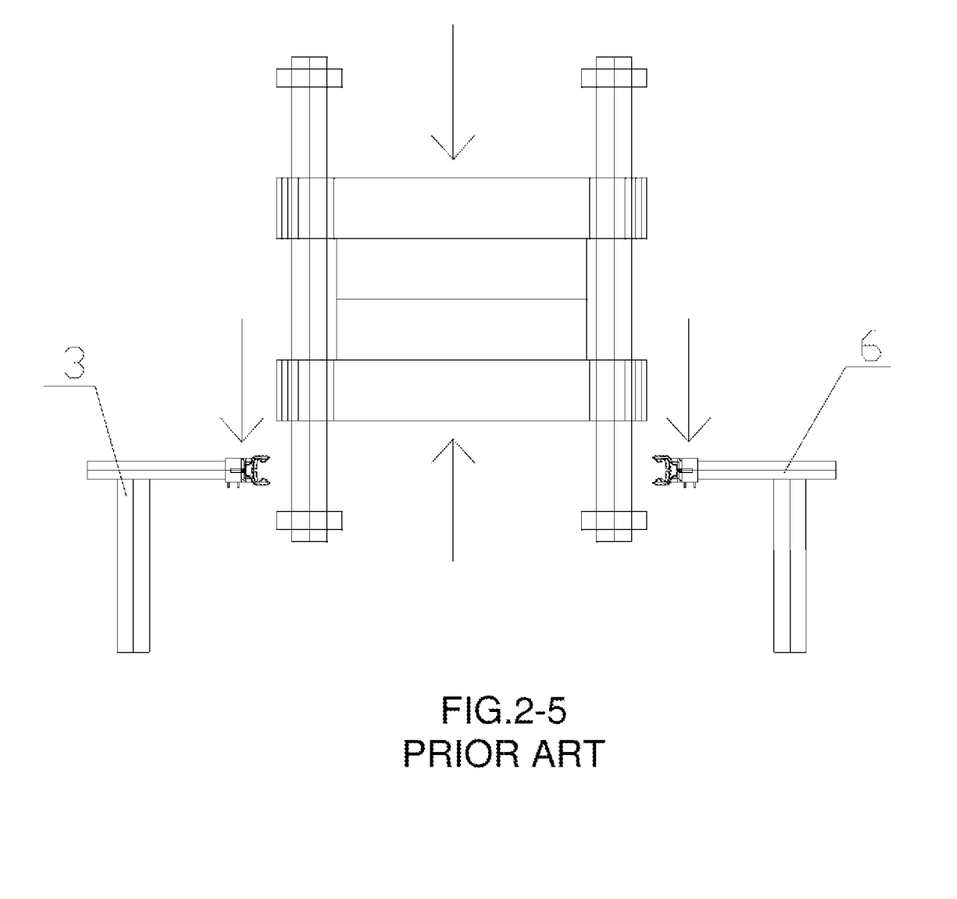

Two positioning ball plungers 14 are provided on the positioning base 10 to limit the closing positions of the left positioning panel 11 and the right positioning panel 12 respectively; when the left positioning panel 11 and the right positioning panel close, the two positioning ball plungers 14 are popped out by their springs 27 respectively; as shown in FIG. 9, positioning beads 28 provided at two ends of the springs 27 respectively are inserted into corresponding positioning grooves 29 at back sides of the left positioning panel 11 and the right positioning panel 12 respectively to prevent continuous closing of the left positioning panel 11 and the right positioning panel 12, thereby limiting the closing positions of the left positioning panel 11 and the right positioning panel 12; the left positioning panel 11 or the right positioning panel 12 is limited to open up to 15 to 35 degrees when opened; when the left positioning panel 11 and the right positioning panel 12 are opened, limitation of the closing positions is automatically achieved by means of contact surfaces between their bottom parts and the positioning base 10.

Figure 8:
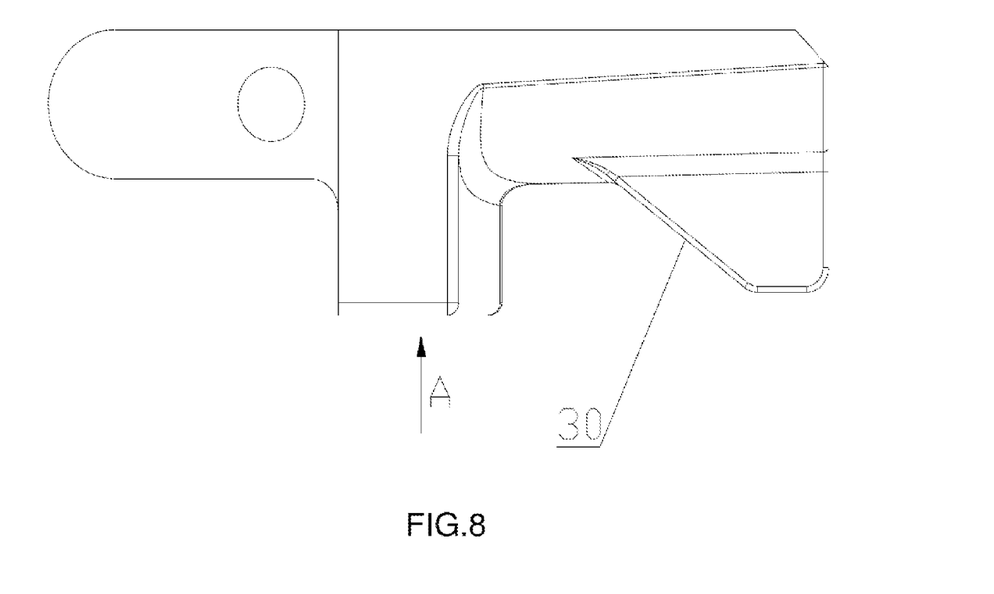
FIG. 8 is a structural view of the left positioning panel or the right positioning panel.

The left positioning panel 11 has an "L" shape while the right positioning panel 12 has a shape of a mirror image of "L", protruding panels are also provided at the bottom parts of the left positioning panel 11 and the right positioning panel 12 respectively; the bottom parts of the left positioning panel 11 and the right positioning panel 12 are hinged with the positioning base 10 via first screws 15 and screw bushes 16; the positioning ball plungers 14 are provided at positions corresponding to back sides of the protruding panels of the left positioning panel 11 and the right positioning panel 12; inner sides of the left positioning panel 11 and the right positioning panel 12 are provided with fixing blocks respectively for fixing a handle; as shown in FIG. 8, the left positioning panel 11 and the right positioning panel 12 are provided with guiding inclined surfaces 30 respectively; the guiding inclined surfaces 30 are provided on the fixing blocks; the fixing blocks protrude inwardly towards each other on end portions of the left positioning panel 11 and the right positioning panel 12 respectively; the guiding inclined surfaces 30 are inclined at 45-65 degrees with respect to vertical surface; when the left positioning panel 11 and the right positioning panel 12 open, and the handle is pulled upwardly, the handle will move upwardly along the guiding inclined surfaces 30 and push aside the left positioning panel 11 and the right positioning panel 12 towards their outer sides.

As shown in FIG. 4, the positioning base 10 is an integral structure forming a one whole piece; the positioning base 10 comprises a base side portion and a base seat connected with each other; the base side portion and the base seat together constitute an "L" shape; a middle part of the base side portion is provided with a handle insertion slot in a shape corresponding to the shape of the handle; a platform is provided on the base seat; two sides of the platform are provided with grooves each in a shape of half of a cylindrical column; the base seat is fixedly connected with the sliding block base 9 via third screws 24.

The bottom parts of the left positioning panel 11 and the right positioning panel 12 are provided with the protruding panels respectively; the protruding panels are provided with holes; bottom parts of the protruding panels provided with holes are positioned in the grooves each having a shape of half of a cylindrical column; the left positioning panel 11 and the right positioning panel 12 are connected with the base side portion at the holes on the protruding panels via first screws and screw bushes.

The press block 13 is provided at outer sides of the protruding panels with holes at the bottom parts of the left positioning panel 11 and the right positioning panel 12; the press block 13 is fixedly connected with the platform on the base seat via second screws 17.

The bottle preform positioning assembly comprises a preform head 18, a preform seat 19, a bearing 20 and a chain wheel 21; the preform head 18 and the preform seat 19 are screw threaded; a bottom part of the preform seat 19 has a rotation shaft; the rotation shaft passes through the sliding block base 9 and then connects sequentially with the bearing 20 and the chain wheel 21; an upper part of the preform head 18 and a bottom part of the chain wheel 21 are provided with snap rings 22 respectively.

The rotation shaft on the preform seat 19 is fixedly connected with the chain wheel 21 via a woodruff key 23.

Figure 5:
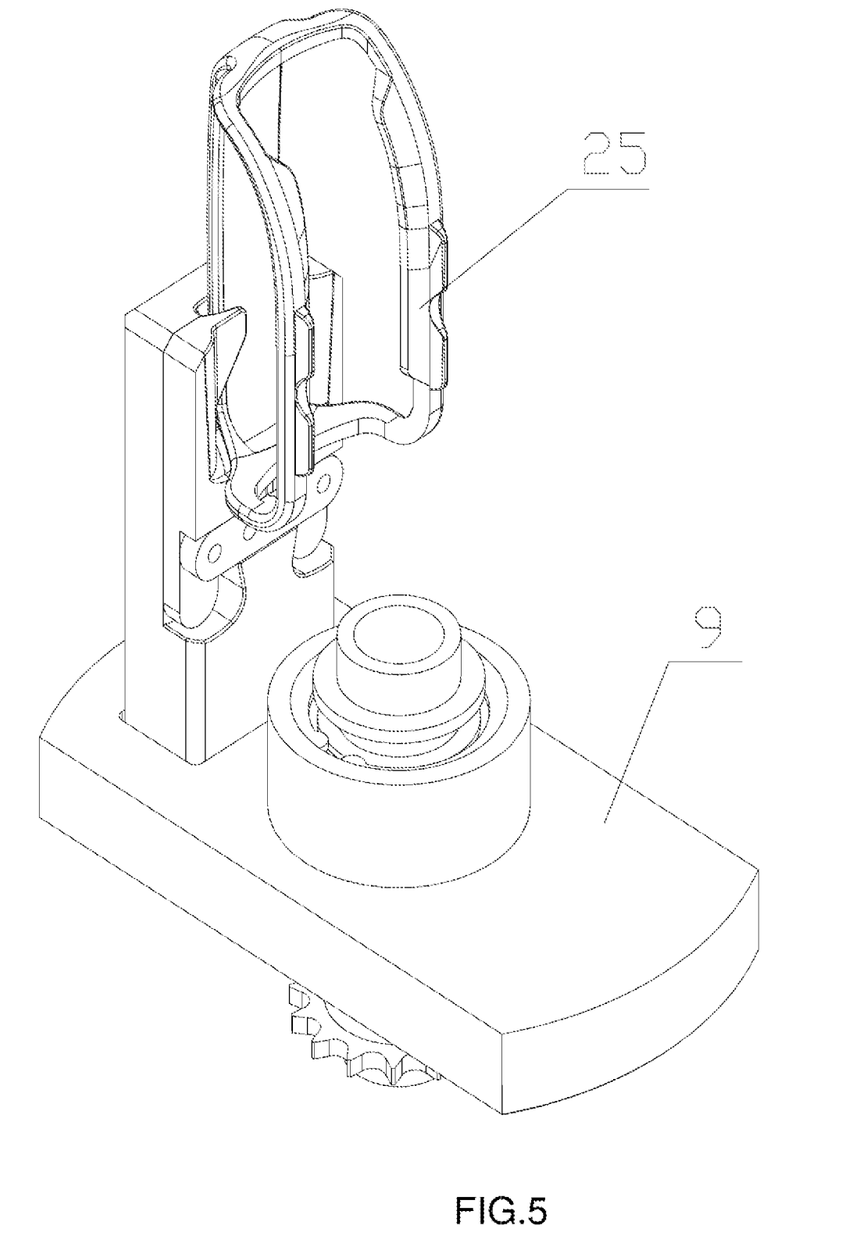
FIG. 5 shows a handle placed into the handle positioning apparatus outside mould according to the present invention.

The working principle of the handle positioning apparatus outside mould for pre-inserted-handle bottle blow moulding machine is described as follows: As shown in FIG. 5, when a handle 25 is put inside the positioning base 10, the handle 25 enters into the handle insertion slot of the base side portion of the positioning base; a bottom part of the handle 25 contacts with the left and right positioning panels 11, 12; when the handle 25 is pressed downwardly, the bottom parts of the left and right positioning panels 11, 12 rotate so that the left and right positioning panels 11, 12 close and thereby accomplishing self-locking; the fixing blocks at the inner sides of the left and right positioning panels 11, 12 fix the handle 25 in the handle insertion slot; after bottle blow moulding is finished, simply pull out the handle 25 and then the left and right positioning panels 11, 12 will be unlocked and return back to an open condition.

A method of using the handle positioning apparatus outside mould for pre-inserted-handle bottle blow moulding machine comprises the following steps:

1. After a bottle preform is mounted to the preform head 18 of the bottle preform positioning assembly and heating is completed, the handle positioning apparatus outside mould carrying the bottle preform is transmitted to a bottle blow moulding waiting position via transmission of the bottle preform conveying track 2.

Figure 71:
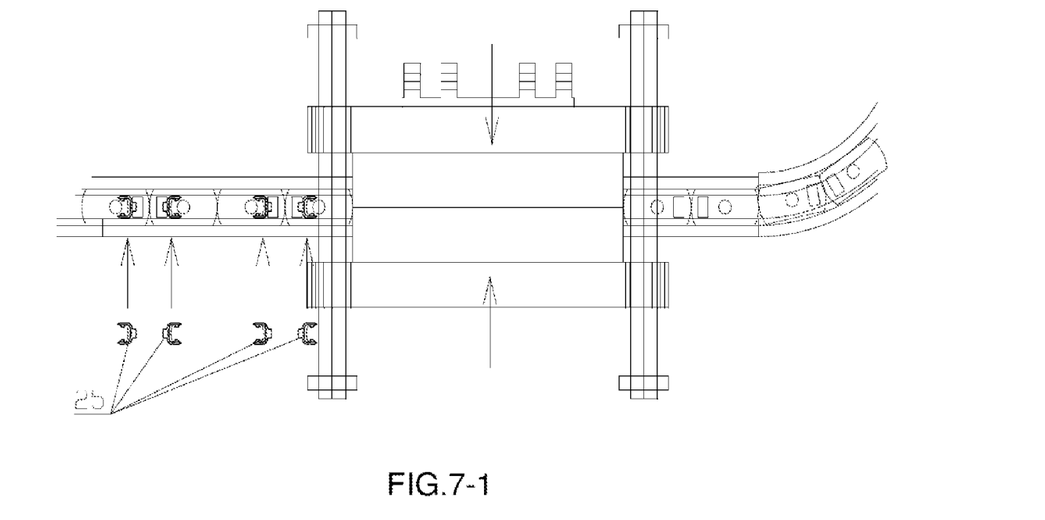

2. As shown in FIG. 7-1, at the bottle blow moulding waiting position, the handle 25 is placed into the positioning base 10; when the handle 25 is pressed downwardly, the left and right positioning panels 11, 12 close and accomplish self-locking and the handle 25 is fixed on the handle positioning assembly.

Figure 72:
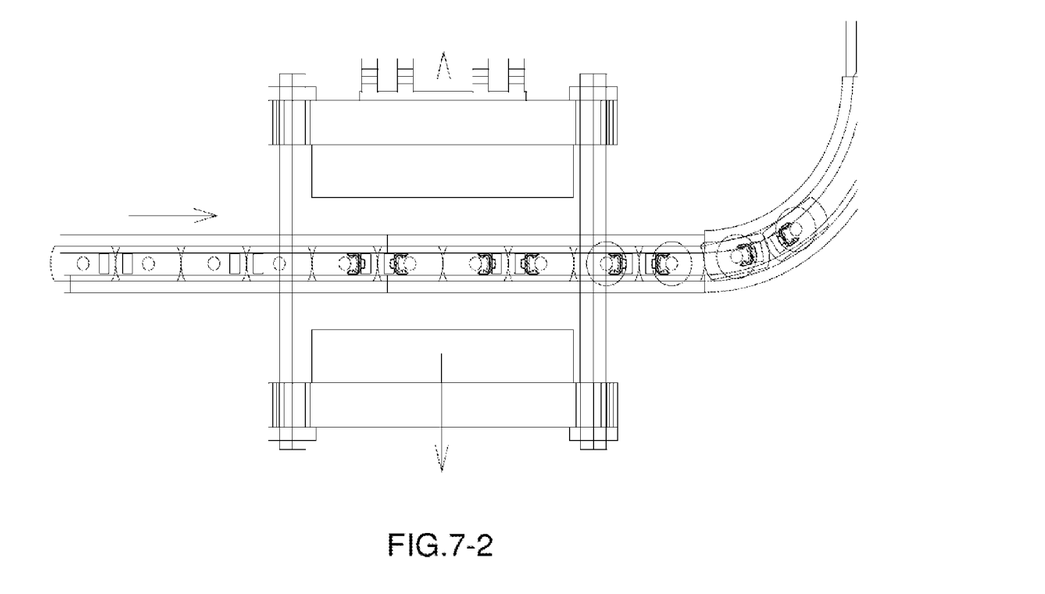

3. As shown in FIG. 7-2, following the transmission of the bottle preform conveying track 2, the handle positioning apparatus outside mould carrying the bottle preform is transmitted to a blow moulding position; previous bottle which is already subject to completed blow moulding will be transmitted away from the mould and the previous bottle made with a handle will be removed from its corresponding handle positioning apparatus outside mould so that the left and right positioning panels of that handle positioning apparatus outside mould will open again; new subsequent handle positioning apparatus outside mould carrying another new bottle preform will also be transmitted to the bottle blow moulding waiting position.

Figure 73:
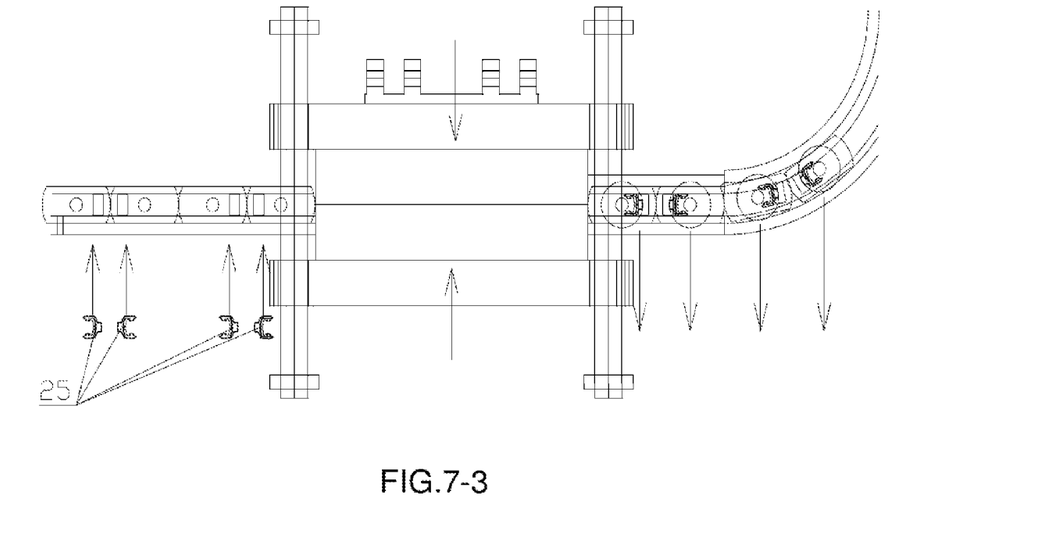

4. As shown in FIG. 7-3, the blow moulding machine closes the mould and performs bottle blow moulding of the bottle preform at the blow moulding position, while another new handle will be put into the new subsequent handle positioning apparatus outside mould at the bottle blow moulding waiting position.

5. The mould of the blow moulding machine opens and steps 3 and 4 are repeated so that the new bottle preform on the new subsequent handle positioning apparatus outside mould will be subject to bottle blow moulding.

In the above procedures, the bottle blow moulding waiting position refers to a position at a side corresponding to the mould on the bottle preform conveying track 2.

There are four handle placing sockets at the bottle blow moulding waiting position; in other words, four handles can be placed respectively into corresponding positioning bases of four handle positioning apparatus in step 2.

The handle 25 can be manually placed into the positioning base 10 or placed into the positioning base 10 by using mechanical arms.

In the above procedures, movement of the handle positioning apparatus on the bottle preform conveying track 2 is powered by a drive cylinder 26. The moulds and the handle positioning apparatus move according the arrows indicated by FIGS. 7-1 to 7-3.

The above embodiment is a preferred implementation of the present invention. The above embodiment is intended to describe only a preferred way of implementing the present invention; it is not intended to limit the scope of the present invention. Any equivalent changes and modification made in accordance with the teaching of the present invention should fall within the scope of protection of the present invention.

What is claimed is:

1. A handle positioning apparatus of a bottle blow moulding machine provided on a bottle preform conveying track for making bottles with pre-inserted handles, wherein the handle positioning apparatus comprises a slidable block base, a handle positioning assembly and a bottle preform positioning assembly; the bottle preform positioning assembly is provided in a middle part of the slidable block base; the handle positioning assembly is provided at a first end of the slidable block base; the handle positioning assembly comprises a positioning base, a left positioning panel, a right positioning panel and a press block; the positioning base is fixedly provided on the first end of the sliding block base; the left positioning panel and the right positioning panel are symmetrically provided on the positioning base; the press block is provided below the left positioning panel and the right positioning panel; the press block and the positioning base are fixedly connected; the left positioning panel and the right positioning panel are both hinged with the positioning base; two positioning ball plungers are provided on the positioning base to limit a closing position of the left positioning panel and a closing position of the right positioning panel respectively; the left positioning panel or the right positioning panel is limited to open up to 15 to 35 degrees when opened.

2. The handle positioning apparatus in claim 1, wherein a protruding panel is provided at a bottom part of the left positioning panel and another protruding panel is provided at a bottom part of the right positioning panel; the bottom part of the left positioning panel and the bottom part of the right positioning panel are hinged with the positioning base via first screws and screw bushes; the two positioning ball plungers are provided at positions corresponding to a back side a of the protruding panel of the left positioning panel and a back side of said another protruding panel of the right positioning panel respectively; an inner side of the left positioning panel and an inner side of the right positioning panel are respectively provided with a fixing block for fixing a handle; each fixing block is provided with a guiding inclined surface thereon; both the fixing block of the left positioning panel and the fixing block of the right positioning panel protrude inwardly so as to face towards each other; the fixing block of the left positioning panel is provided on an end portion of the left positioning panel and the fixing block of the right positioning panel is provided on an end portion of the right positioning panel; each guiding inclined surface is inclined at 45-65 degrees with respect to a vertical surface.

3. The handle positioning apparatus as in claim 2, wherein the positioning base is an integral structure forming a one whole piece; the positioning base comprises a base side portion and a base seat connected with each other; a middle part of the base side portion is provided with a handle insertion slot in a shape corresponding to a shape of the handle; a platform is provided on the base seat; a groove is provided on each side of the platform; the base seat is fixedly connected with the slidable block base via third screws;

each protruding panel is provided with a hole; a bottom part of each protruding panel is positioned in the respective groove; a position on the left positioning panel where the hole of the left positioning panel is located and a position on the right positioning panel where the hole of the right positioning panel is located are connected with the base side portion via first screws and screw bushes;

the press block is provided at outer sides of the protruding panel of the left positioning panel and the protruding panel of the right positioning panel; the press block is fixedly connected with the platform on the base seat via second screws.

4. The handle positioning apparatus as in claim 1, wherein the bottle preform positioning assembly comprises a preform head, a preform seat, a bearing and a chain wheel; the preform head and the preform seat are screw threaded; a bottom part of the preform seat has a rotation shaft; the rotation shaft passes through the slidable a block base and then connects with the bearing and the chain wheel sequentially; an upper part of the preform head and a bottom part of the chain wheel are each provided with a snap ring.

5. The handle positioning apparatus as in claim 4, wherein the rotation shaft on the preform seat is fixedly connected with the chain wheel via a woodruff key.

6. A method of using the handle positioning apparatus as claimed in claim 1; the method comprises the following steps:

step 1: mounting a bottle preform to a preform head of the bottle preform positioning assembly of the handle positioning apparatus; heating the bottle preform; conveying the handle positioning apparatus which carries the bottle preform to a bottle blow moulding waiting position via a bottle preform conveying track;

step 2: placing a handle into the positioning base of the handle positioning assembly of the handle positioning apparatus when the handle positioning apparatus is at the bottle blow moulding waiting position; pressing the handle downwardly so that the left positioning panel and the right positioning panel close towards each other and accomplish self-locking to fix the handle on the handle positioning assembly;

step 3: conveying the handle positioning apparatus at the bottle blow moulding waiting position to a blow moulding position via the bottle preform conveying track, while new subsequent handle positioning apparatus carrying another new bottle preform is conveyed to the bottle blow moulding waiting position also via the bottle preform conveying track;

step 4: closing a blow mould of the bottle blow moulding machine to perform bottle blow moulding of the bottle preform at the blow moulding position; placing a new handle into the new subsequent handle positioning apparatus at the bottle blow moulding waiting position; after a bottle is blow moulded together with the handle in the blow mould of the bottle blow moulding machine, opening the blow mould of the bottle blow moulding machine, and removing the blow moulded bottle away from the blow mould and the handle positioning apparatus so that the left positioning panel and the right positioning panel open again;

step 5: repeating steps 3 and 4 so that the new bottle preform on the new subsequent handle positioning apparatus will be subject to bottle blow moulding; wherein the bottle blow moulding waiting position refers to a position at a side of the blow mould on the bottle preform conveying track.

7. The method of using the handle positioning apparatus as in claim 6, wherein at the bottle blow moulding waiting position, three more handle positioning apparatus are provided such that three more handles are placed respectively into corresponding positioning bases of the three more positioning apparatus in step 2.

8. The method of using the handle positioning apparatus as in claim 6, wherein the handle is manually placed into the positioning base or placed into the positioning base by using mechanical arms.

* * * * *